United States Patent [19]
Scaliti

[11] Patent Number: 5,843,493
[45] Date of Patent: Dec. 1, 1998

[54] INVERTER DEVICE FOR MOULDS

[75] Inventor: Piercarlo Scaliti, Rodello, Italy

[73] Assignee: Soremartec S.A., Schoppach-Arlon, Belgium

[21] Appl. No.: 721,321

[22] Filed: Sep. 26, 1996

[30] Foreign Application Priority Data

Sep. 29, 1995 [CH] Switzerland .............................. 2754/95

[51] Int. Cl.[6] .................................................. B29C 33/20
[52] U.S. Cl. ........................ 425/451; 425/451.4; 425/453; 425/DIG. 5
[58] Field of Search ................................ 425/439, 451.4, 425/454, 125, 116, 451, 453, DIG. 5; 99/450.6, 450.7

[56] References Cited

U.S. PATENT DOCUMENTS

| | | | |
|---|---|---|---|
| 3,391,656 | 7/1968 | Schafer | 425/116 |
| 3,666,388 | 5/1972 | Oberwelland et al. | 425/543 |
| 3,704,979 | 12/1972 | Thiessen | 425/541 |
| 4,854,228 | 8/1989 | Ferrero | 99/450.6 |

FOREIGN PATENT DOCUMENTS

| | | |
|---|---|---|
| 0083324 | 4/1988 | European Pat. Off. . |
| 2041557 | 1/1971 | France . |
| 415990 | 7/1925 | Germany . |
| 2536727 | 2/1977 | Germany . |
| 3005838 | 2/1982 | Germany . |
| 604584 | 5/1960 | Italy .................................. 425/116 |
| 752478 | 7/1956 | United Kingdom . |
| 1405861 | 9/1975 | United Kingdom . |

OTHER PUBLICATIONS

"Aasted Fully Automatic Chocolate Moulding Plants," *Confectionery Production*, Jun., 1964, pp. 447–449.

"Apparatus for Producing Folded Confectionery," Patent Abstracts of Japan, vol. 18, No. 296 (C–1209) and JP 06062719A (Aisan Seisakusho), Mar. 8, 1994 (Abstract).

*Primary Examiner*—Robert Davis
*Attorney, Agent, or Firm*—Rothwell, Figg, Ernst & Kurz

[57] ABSTRACT

An inverter device is intended to operate on half-moulds which advance in alternate sequence on a conveyor line. The inverter device has inverter sets on both sides of the conveyor line, each of which comprises a fixed unit and a movable unit with respective engagement formations capable of engaging the half-moulds by the effect of a general approaching movement towards the conveyor line. Having achieved engagement of the half-moulds the movable unit is then driven to rotate by means of a mechanism actuated by a cam so as to obtain the desired inverting movement. The same configuration can be utilised equally well for causing book-like mould closure movement of adjacent half-moulds as for causing mould-opening motion of superimposed half-moulds.

14 Claims, 5 Drawing Sheets

INVERTER DEVICE FOR MOULDS

The present invention relates to an inverter device for moulds.

A device of this type is known, for example, from EP-A-0 083 324.

In this prior document here is described a process for producing a confectionery product comprising a spherical casing of wafer constituted by a pair of hemispherical shells maintained together by the contact between respective fillings. One shell is located in a hemispherical cavity of a first half-mould, whilst the other shell is introduced into a cavity in a second half-mould, alongside the first half-mould, which has a portion adjacent its edge having a mouth part which can perform a retaining action on the shell located within it. After each shell has been filled with a filling having characteristics of adhesion to the wafer the second half-mould is inverted onto the first half-mould in such a way as to bring the two shells together. Such products are produced in a device comprising a conveyor line on the movable bed of which are disposed first and second moulds (half-mould) in alternating sequence, which have part-spherical cavities. The machine further includes first and second pairs of fork-like engagement elements located on either side of the conveyor line. The engagement elements of each pair are movable towards one another so as to engage a pair of adjacent half-moulds on the movable bed of the conveyor line. The fork-like engagement elements of the second pair have associated therewith drive means which impart to these engagement elements, when they are located in the working position with a second half-mould engaged between them, a turning movement to bring the second half-mould into a position turned over onto the first half-mould. By operating with a complementary arrangement it is then possible to turn the half-mould over again raising it with respect to the first half-mould so as to return it back to the adjacent position.

The present invention seeks further to improve the known arrangements, above all as far as the following factors are concerned:

further improvement in the speed and precision of the engagement of the half-moulds by the inverter device,
the possibility, of operating the inverter device in an entirely synchronised manner with the advancement of the half-moulds along the conveyor line without giving rise to interruptions or slowing down which could detrimentally affect the efficiency of the production process.

According to the present invention this object is achieved by an inverter device having the characteristics specifically set out in the appending independent claim(s).

The invention will now be described, purely by way of non-limitative example, with reference to the attached drawings, in which.

As an introduction to the description of an embodiment of the invention it appears useful to state the following.

The expression "inverter" as thus used in the present description and in the claims which follow applies in an identical manner both to the inverting function upon closure which brings two moulds (half moulds) originally disposed one alongside the other to a position with one superimposed over the other following a book-like closure movement, and to the complementary inverting function upon opening, which brings two superimposed half-moulds back to the side-by-side position. Thus, as will be seen hereinbelow, the arrangement according to the invention lends itself in an ideal manner to performing both of these functions by means of the same basic structure.

Again, although in the introductory part of the present description reference has been made both as far as the structure of the products which are formed and as far as the structure of the moulds is concerned to the arrangement described in EP-A-0 083 324, this reference must not be interpreted in any limitative way on the scope of the invention. The invention is in fact usable also to produce products of different type (in general all those products in which, in one phase or other of the manufacturing process or during packaging, an inversion of a mould or half-mould onto a complementary element is envisaged). Nor must the invention be considered as in any way limited to the use of moulds of the type illustrated in detail in EP-A-0 083 324: what is important for the purposes of the invention is that there be present two moulds (or half-moulds) which, in one phase or another of a manufacturing or packaging process must be brought to a face-to-face coupling position by turning one over onto the other.

Figure 1:
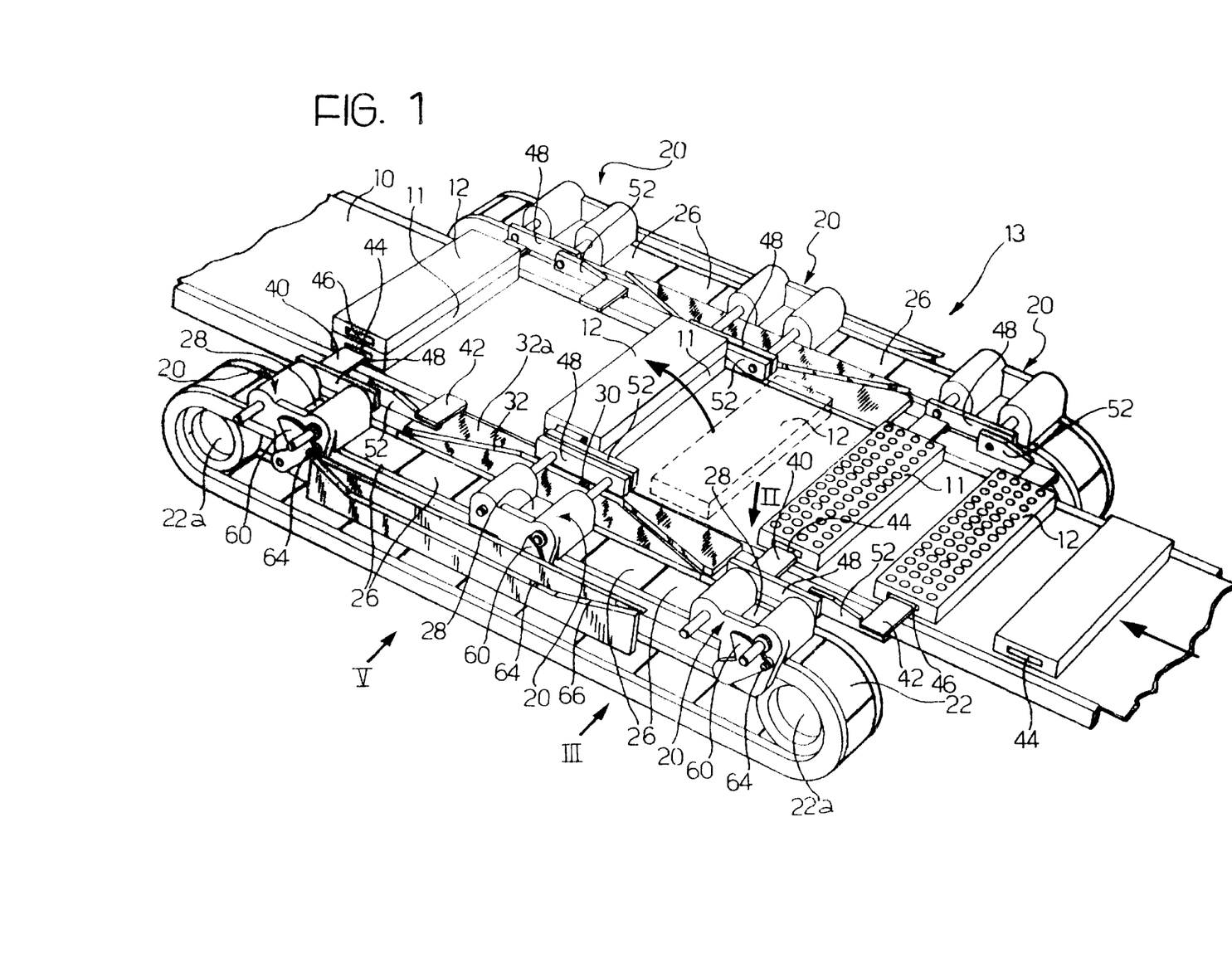
FIG. 1 is a schematic perspective view of an inverter device according to the invention.

In FIG. 1 a conveyor line (for example a conveyor belt or chain of known type) is generally indicated with the reference numeral 10, on which advance, disposed in sequence alternately, first and second moulds referred hereinafter as half-moulds 11, 12 each of which is provided with a plurality of cavities intended to receive respective hemispherical shells of wafer intended to receive a cream or paste filling. The first and second half-moulds 11, 12 which, as seen in FIG. 1 are moved by the line 10 from right to left, are usually constituted by approximately rectangular plates disposed with the major sides orthogonal to the direction of movement along the line 10 and the minor sides facing the sides of the line 10 in a position generally accessible from the exterior.

In the production of a product such as a confectionery food product (not illustrated) comprising a spherical casing of wafer constituted by a pair of hemispherical shells held together in contact by adhesion between the respective fillings, one shell is located in one hemispherical cavity of a first half-mould 11 whilst the other shell is introduced into a complementary cavity of the second half-mould 12 of each pair. After each shell has been filled with a filling having characteristics of adhesion to the wafer the second half-mould 12 is turned over in book-like fashion onto the first, complementary, half-mould 11 in such a way as to bring the two shells into mutual face-to-face contact.

This result is obtained at a coupling or closure station (inverter device) 13 disposed along the conveyor line 10 and having the structure which will be illustrated more clearly hereinbelow.

Having thus obtained closure of the two shells defining the casing of the product, in a subsequent uncoupling or opening station (not illustrated but also substantially constituted by an inverter device 13 such as that which will be better illustrated hereinafter) the second half-moulds 12 are again turned over back to the position alongside the first half-moulds 11 where the closed products deposited are available.

All that has been described above is achieved in a manner and according to criteria illustrated in greater detail in the above-mentioned European Patent Application EP-A-0 083 324, to which reference can be made for a better illustration of these aspects which, however, are not, per se, significant for the purposes of understanding the implementation of the invention.

Essentially, the device 13 according to the invention performs the mould-closing inversion action turning the half-moulds 12 onto the half-moulds 11 and, in a complementary manner, the mould-opening inversion action with consequent lifting of the half-moulds 12 from the half-moulds 11 so as to reposition the moulds 12 alongside the half-moulds 11.

The device 13 comprises one or more inverter units 20 each of which is intended to operate on a pair of half-moulds 11, 12. Preferably it is arranged that the device 13 includes several units of this type for a greater production efficiency. Each inverter unit 20 is composed of two complementary elements situated on opposite sides of the conveyor line 10 and intended to operate in a coordinated manner by acting on the opposite sides of the half-moulds 11 and 12. Since, apart from the specular geometry with respect to the ideal vertical median plane of the line 10, such units are practically entirely identical with one another, in the following description reference will be made to only one of these units, situated on one side of the line 10.

Again, since, as already mentioned hereinabove, the same structure can be utilised equally for the mould-closing inverting operation for closure of the half-moulds 11, 12 as for the mould-opening inverting action, the following description will make specific reference to the inverting operation for closure: it is, however, understood that what is described for the inverting operation for closure is equally valid, with the single exception of the different direction of movement, for the inverting operation for opening.

If, as in the preferred embodiment of the invention, there are several inverter units 20 these are disposed on a cyclic conveyor device constituted, in the embodiment illustrated here, by a closed loop belt or chain 22 so as to present a respective active branch 24 which extends and moves (from right to left as seen in the drawings) adjacent the conveyor line 10 along the sections on which it is desired to achieve the inverting action of the half-moulds 11, 12 (as has been mentioned, reference will be made hereinafter by way of example to the inverting operation for closure).

The belt 22 illustrated here is constituted by an assembly of links or belts (track) 26 articulated so as to be able to pass around respective end rollers 22a.

Each unit 20 can thus "follow" the path of movement of the line 10 in a synchronous manner for a certain section so as to be ideally stationary (in terms of zero relative motion) with respect to the half-moulds 11, 12 on which they are to act.

It goes without saying that the same action of the units 20 cyclically following the path of the line 10 can be obtained with different means from those illustrated, for example by means of oscillating moving parts etc. The use of a closed loop strip or chain (typically a belt) appears preferred however, at least at the current time, in terms of efficiency, precision, speed and small dimensions.

Each unit 20 essentially comprises a base plate 28 mounted on a respective link or belt 26 of the conveyor 22.

On the plate 28 are mounted two half-mould engagement units 11, 12.

For clarity of illustration the said units will hereinafter be distinguished as "fixed" units 36 and "movable" units 38. The distinction refers to the fact that, whilst the unit 36 is intended to cooperate with the half-moulds 11 which are maintained stationary on the line 20, the unit 38 is intended to cooperate with the half-moulds 12 intended to be turned over with respect to the half-moulds 11.

Both the units 36 and 38 are, however, made in such a way as to present a certain capacity for translation in a transverse direction with respect to the direction of advance of the belt or chain 22 and thus with respect to the direction of advancement of the half-moulds 11, 12 on the line 10.

The said translation movement is regulated by the engagement of a follower roller 30 which projects downwardly from the base plate 28 and engages in a guide groove or slot 32 formed in a horizontal plate 32a mounted in a fixed position with respect to the framework (not explicitly shown in the drawings) of the conveyor line 10. The groove or slot 32 therefore acts as a cam: by the effect of the movement imparted to the belt or chain 22 the roller 30 is introduced into and slides within the groove or slot 32 and follows the path so as to determine the translation of the units 36 and 38 between:

a retracted position in which these units are located in laterally withdrawn positions with respect to the half-moulds 11, 12, and an advanced position in which the units 36, 38 approach the line 10 to engage the half-moulds 11, 12.

To this end both the units 36 and 38 are provided on their side facing towards the line 10, and thus towards the half-moulds 11, 12 which advance on this line, with engagement formations intended to cooperate with the half-moulds in question by engaging them in correspondence with their minor sides.

In the embodiment illustrated here these engagement formations are constituted by blade- or ran like elements 40, 42 (FIG. 2) which can penetrate into corresponding apertures or slots 44, 46 provided in the sides of the half-moulds 11, 12.

Preferably, the blade-like formations 40, 42 have a generally flattened form with a slightly tapered distal end to which corresponds a slightly divergent mouth part of the apertures 44, 46 in the form of an entrance.

The advancing movement of the belt or chain 22 is exactly synchronised (in a known manner, for example by the effect of a mechanical coupling) with the movement of the line 10. This is to ensure that when the half-moulds 11 and 12 advance along the line 10 in correspondence with the inverter device 13, the apertures 44 and 46 are exactly aligned with the engagement formations 40, 42 projecting from the inverter unit 20.

When the half-moulds 11, 12 advance towards the inverter device 13 the formations 40, 42 are located in their retracted position spaced from the line 10. Whilst the half-moulds 11 and 12 advance through the inverter device 13 the cam slot 32 in which the follower roller 30 slides defines for the roller 30 a trajectory which approaches the line 10 consequently drawing the units 36 and 38 mounted on the unit 20 (more precisely the two units 20 situated on the opposite sides of the line 10) towards the line 10 itself with consequent penetration of the formations 40, 42 into the cavities 44 and 46. In these conditions, and as long as the units 36 and 38 are maintained in their advanced positions with respect to the line 10, the half-moulds 11, 12 are therefore engaged by the formations 40, 42.

As mentioned, the tapered shape of the formations 40, 42 and the flared opening of the apertures 46 and 48 act as mutual entrances allowing a precise positioning and engagement of the aperture by the blade-like formations to be obtained without any jamming or blocking phenomena occurring.

Figure 2:
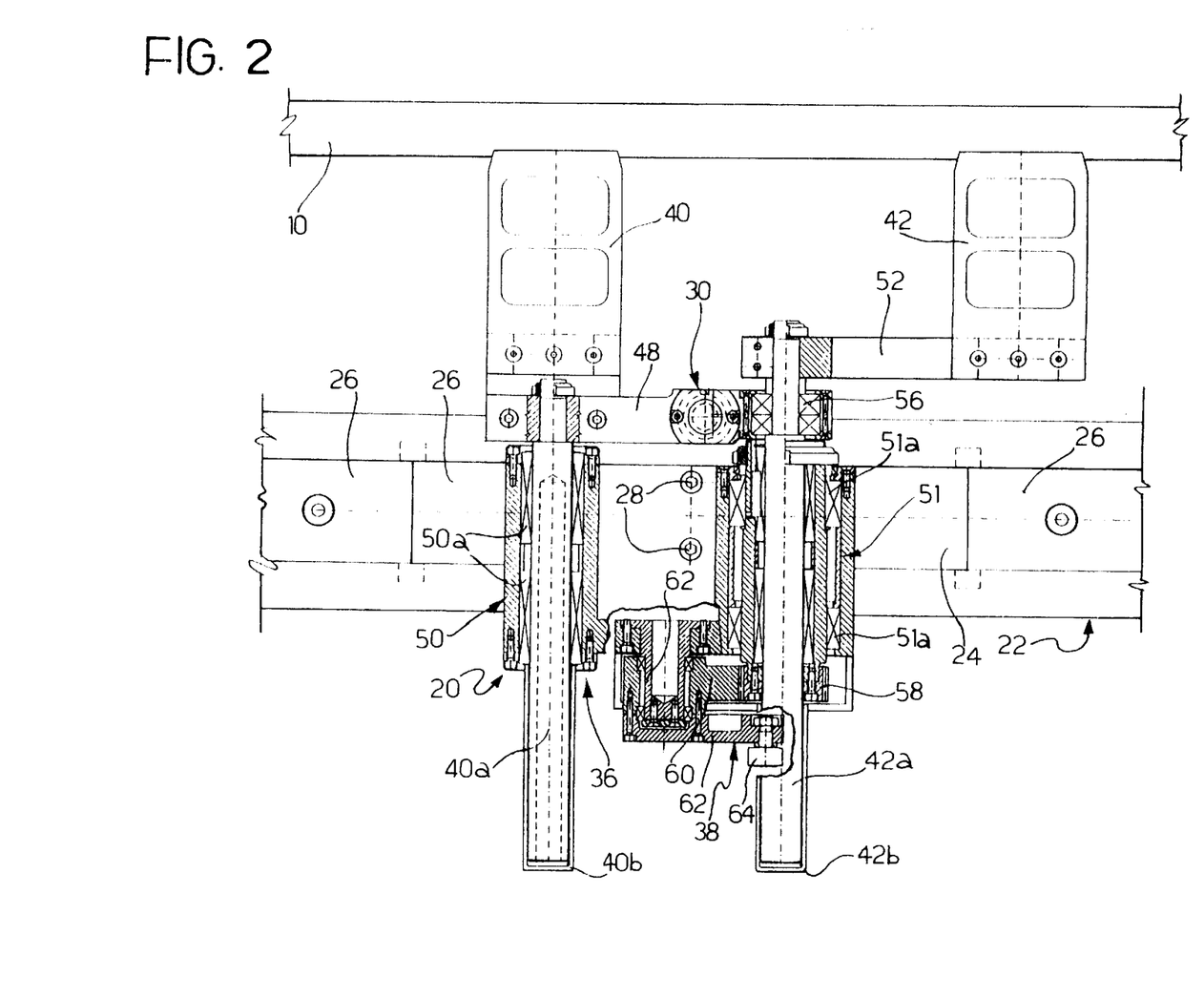
FIG. 2 is a view from above, partially separated and in section of a part of the device indicated by the arrow II in FIG. 1.

As far as the control of the advancing and retracting movement of the units 36 and 38 is concerned (that is to say the gripper formations 40 and 42) it can be seen, in particular in FIG. 2, that both these formations are mounted on respective rod-like parts 40a, 42a which are connected, on the side of the unit 20 facing the line 10, by a bridge element 48 from which the roller 30 projects downwardly.

Again, although currently considered preferential, it should be stated that the arrangement described above is not the only one which can be envisaged for obtaining engagement of the half-moulds 11, 12 by the unit 20. Whilst retaining the engaging movement deriving from the approach of the unit 20 to the line 10 it is undoubtedly possible to think of various different arrangements all retaining the characteristics of precision and alignment necessary: for example one may cite the fork-like gripping elements such as those described in earlier Patent Application EP-A-0 083 324.

The arrangement described in the present application does, however, have various preferred aspects, above all as far as the greater compactness is concerned and the absence of elements which project upstream and downstream of each half-mould, with the consequent possibility of acting with adjacent half-moulds 11, 12 virtually in contact with one another.

Figure 3:
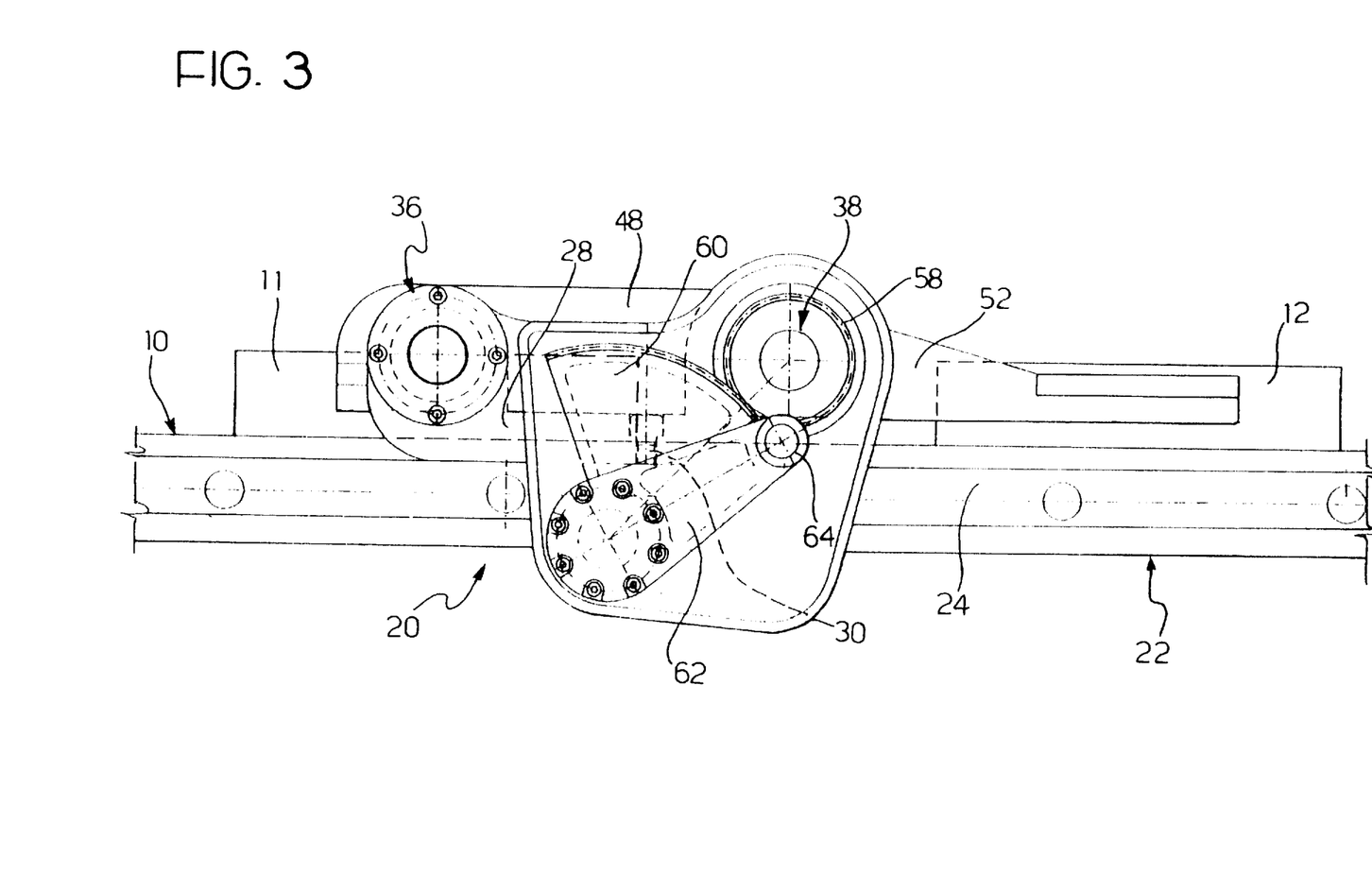
FIGS. 3 to 5 are side elevation views of the device according to the invention observed in different operating positions; in particular the views of FIGS. 3 and 5 can be considered as views in the direction of the arrows III and V of FIG. 1.

As can be seen better in FIGS. 2 and 3, in the fixed unit 36 the part of the horizontal rod 40a which supports the blade-like part 40 intended to engage the half-moulds 11 is received in a sleeve 50 with the possible interposition of bearings 50a and with the possible presence of a tubular cap 40b for protecting the end of the rod 40a opposite the line 10 for the purpose of ensuring the regularity of the movements of the fixed unit 36 towards and away from the line 10 without loss of desired positioning precision.

The structure of the movable unit 38 is generally similar but slightly more complex.

It will be appreciated, in the first place, that the blade part 42 is not in a position aligned with respect to its horizontal rod 42a (also mounted in a sleeve 51 with the provision of bearings 51a and a protection cap 42b). The blade part 42 is in fact mounted at the distal end of a crank 52 the proximal end of which is fixed to the rod 42a which, as can be noted better from observation of FIG. 2, as well as being able to slide longitudinally in the sleeve 51 is also capable of rotating within the sleeve 51 itself about an axis generally orthogonal to the direction of advance of the line 10. In order to be able to facilitate this rotation the rod 42a is coupled to the bridge element 48 with the interposition of a bearing 56.

At the opposite end from the crank 52 the rod 42a which acts as an inverter shaft for the movable unit carries fitted thereto a toothed wheel 58 which in turn meshes with a toothed sector 60 rotatably mounted on a pin 62 mounted horizontally on the plate 28 (preferably on a sort of leg projecting downwardly from the plate 28 itself). The toothed sector 60 is fixed for rotation with a lever 62 to the free end of which is mounted a roller 64 having a horizontal axis and capable of acting as a cam follower in relation to a further groove or slot cam 66 fixedly mounted to the frame of the line 10 on one side, generally the outer side, of the unit 20. This, with the exception of the different orientation, which in this case is vertical, is the same arrangement as described hereinabove in relation to the cam 32 and the roller 30. The arm 62 is thus able to oscillate, by the effect of the cam follower action exerted by the roller 64 following the cam 66, between two end positions.

The first end position, illustrated in solid outline in FIG. 3, is that corresponding to the arrangement of the crank 52 of the movable unit 38 in a horizontal position on the opposite side from the fixed unit 36. In these conditions the engagement formations 42 are substantially coplanar with the formations 40 and located at a distance substantially equal to the distance which separates the two engagement apertures 44 and 46 in two successive adjacent half-moulds 11 and 12.

At the opposite end of its oscillation movement, by the effect of the transmission of the movement caused by the gear 58, 60, the arm 62 carries the crank 52 to perform an inverting movement of about 180° so as to carry the engagement formation 42 into superimposition over the engagement formation 40. This condition is illustrated in FIG. 5, whilst FIG. 4 illustrates an intermediate position in the inverting movement described.

Figure 4:
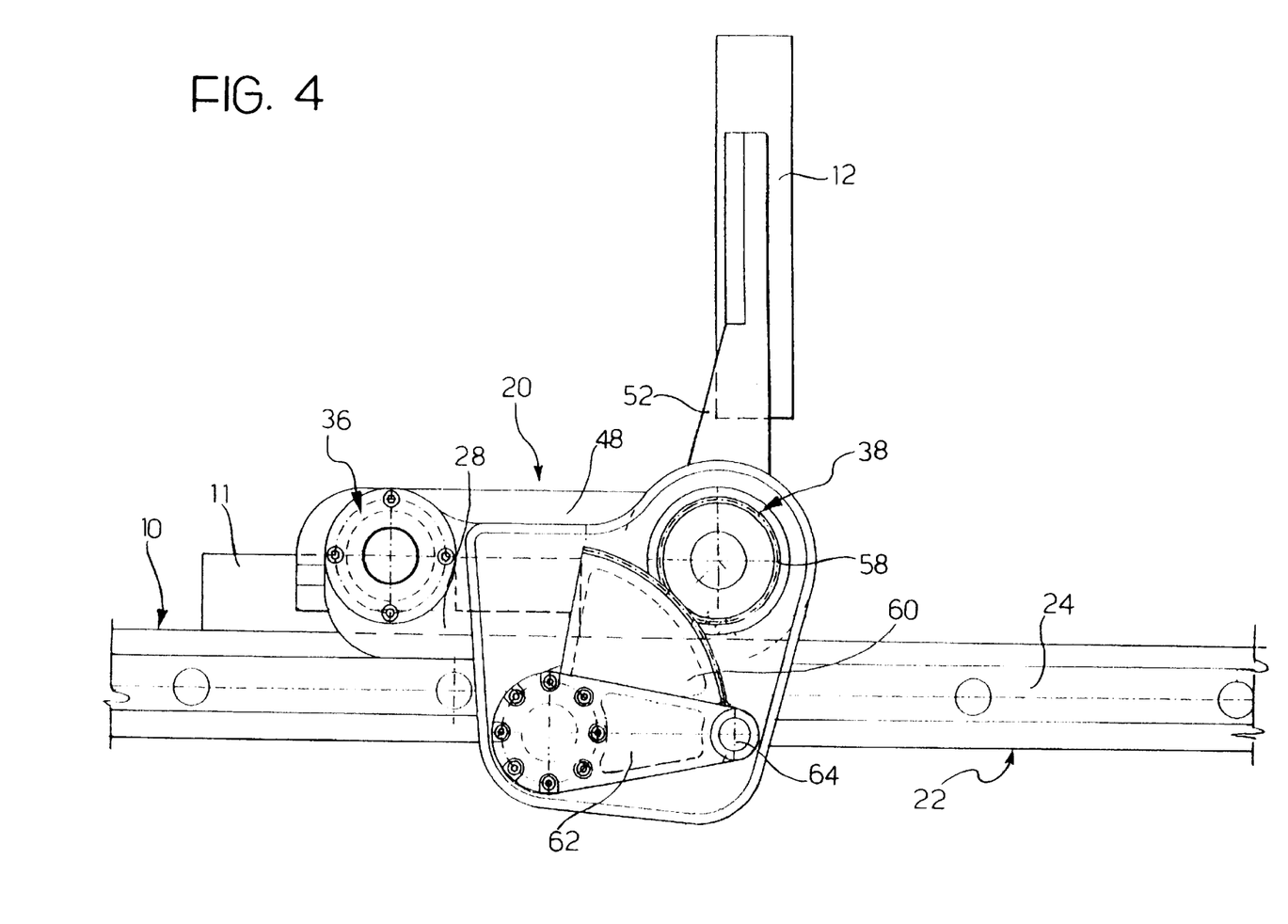
Figure 5:
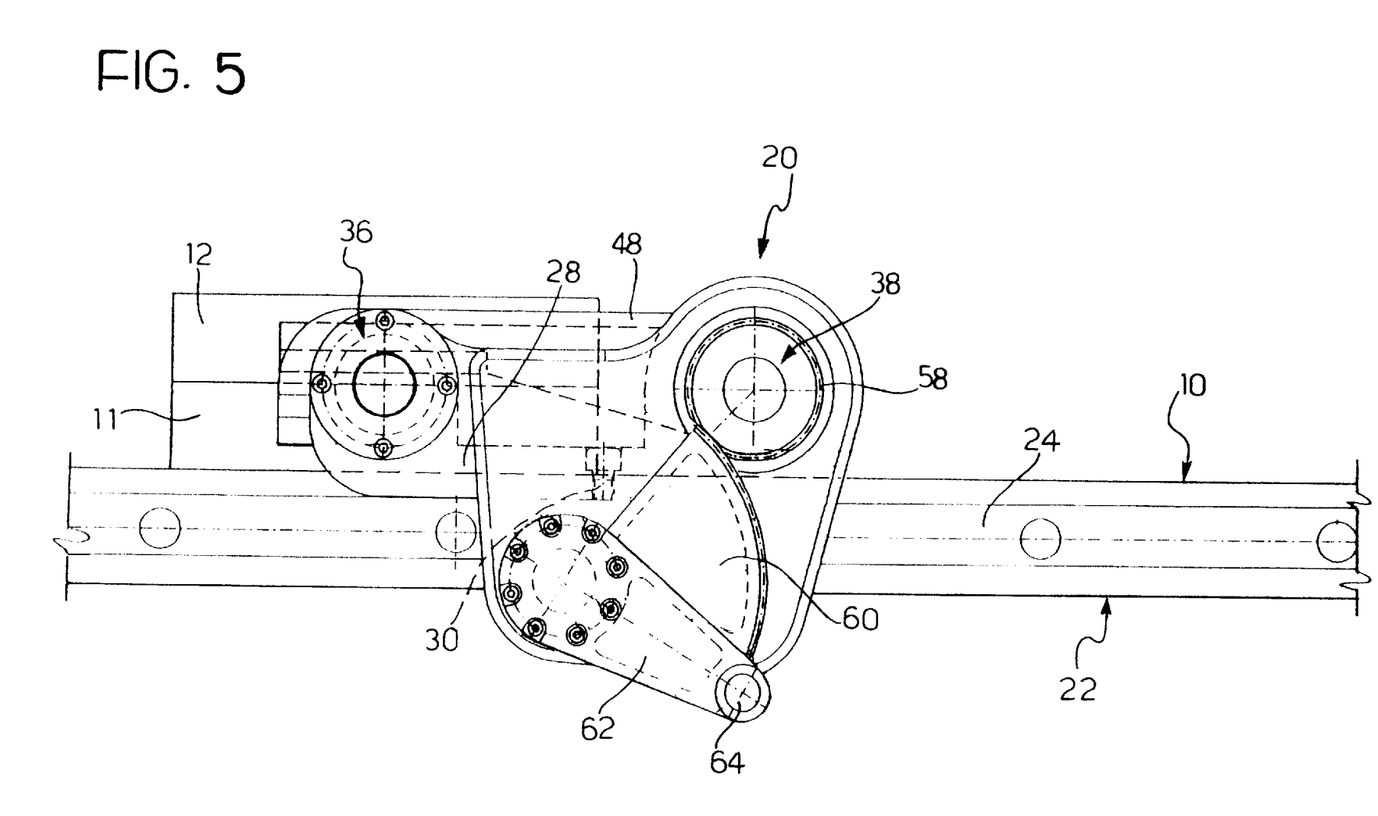

From observation of FIGS. 3 to 5 it is evident that by controlling the oscillation of the arm 62 between the two end positions of FIGS. 3 and 5 it is possible to obtain inversion of the engagement formation 42 with respect to the engagement formation 40 and, consequently, the desired inversion of the half-moulds 12 with respect to the half-moulds 11.

The said oscillation of the arm 62 is determined only by the cam 66 the profile of which is regulated, in correspondence with the active section 24 of the conveyor 22 so as to obtain, in correspondence with the inverter device 13, the required movement which carries the half-moulds 12 into superimposition over the half-moulds 11 (in the case of the closure inversion station such as that illustrated in FIG. 1) that is to say the half-moulds 12 superimposed over the respective half-moulds 11 to return to adjacent positions alongside the half-moulds 11 themselves (in the case of the opening inversion station not illustrated).

Summarising, at the inverter device 13 used to turn over the half-moulds 12 onto the half-moulds 11 the profiles of the cams 32 and 66 are defined in such a way as to achieve within each unit 20 the following mechanical movements:

at the input of the inverter device 13 the unit 20 is in the retracted position away from the line 10, with the engagement units 40 and 42 coplanar with one another and spaced as illustrated in FIG. 2, subsequently, the roller 30 is drawn by the cam 32 in such a way as to cause advancement of the movable units 36 and 38 towards the line 10 with the consequent engagement of the apertures 44 and 46 by the engagement members 40 and 42, upon proceeding further a cam 66 acts on the arm 62 through the follower roller 64 so as to carry the engagement formation 42 of the movable unit 38 which engages a respective half-mould 12 to perform an inverting movement of about 180° corresponding to the passage of the crank 52 into the position illustrated in FIG. 5 with the engagement member 42 superimposed over the engagement member 40; in these conditions the desired turning over of the half-moulds 12 onto the half-moulds 11 is obtained, having turned over and closed the half-moulds the roller 30 is again drawn by the cam 32 in such a way as to cause separation of the unit 20 from the line 10: the half-moulds 11, 12 are thus abandoned by the unit 20 by the withdrawal of the engagement formations 40, 42 from the apertures 44 and 46, and finally the roller 64 is again carried back by the cam 66 from the position illustrated in FIG. 5 to the position illustrated in FIG. 3; the engagement formation 42, disengaged from the respective half-mould 12, thus returns back to the starting position coplanar to and adjacent but spaced from the formation 40. This latter phase carries the unit 20 back into the starting position in which, by the effect of the orbital movement imparted to it by the belt or chain 22 it can return to the upstream end of the device 13 by moving along the lower branch of the link belt 22 so as to be able to repeat the inverting cycle described.

In the inverting unit in which the half-moulds are opened (not illustrated) the sequence of operations is exactly complementary:

when the half-moulds 11 and 12 (with the half-moulds 12 superimposed over the half-moulds 11) enter the mould-opening inverting unit the units 20 of this are in the retracted position away from the line 10, with the engagement formation 42 of the movable unit 38 inverted over the engagement formation 40 of the fixed unit 36, by the effect of their advancement along the line 10, the rollers 30 are drawn by the cam 32 so as to cause approach of the unit 20 to the line 10: the effect of this approaching movement causes the engagement formations 40, 42—which are superimposed over one another—to engage the apertures 44, 46—also superimposed over one another - of the half-moulds 11, 12 which are closed over one another;

after engagement of the half-moulds 11, 12 the cam 66 (which in this case has obviously a complementary profile with respect to the cam 66 in the mould-closure inverting station) causes, by means of the roller 64, the arm 62 to turn in a complementary manner with respect to that described above, that is to say from the position illustrated in FIG. 5 to the position illustrated in FIG. 3; the effect of this movement causes the crank 52 to rise carrying the engagement formation 42 upwards with it, with the half-mould 12 supported from it, thereby imparting to the half-mould 12 itself an inverting movement of about 180° until it is brought back into the rest position alongside the corresponding half-mould 11, having achieved the mould-opening inverting movement of the half-moulds 12 the roller 30 is again drawn by the associated cam 32 so as to cause the units 20 to move away from the line 10, with consequent disengagement of the engagement formations 40, 42 from the apertures 44, 46 and finally, still by the effect of the turning moment of the arm 62 controlled by the cam 66 through the roller 64, the movable unit 38 is carried back into the starting position shown in FIG. 5; at this point the unit 20, following the orbital movement imparted to it by the belt or chain 22 can return towards the upstream end of the device by moving along the lower branch of the belt or chain 22 so as to reset it for repetition of the mould-opening inverting cycle described above.

It goes without saying that without departing from the general operating principle the constructional details of the movable and fixed units 36 and 38 can be widely varied with respect to what has been described hereinabove. This is equally valid, in particular, as far as the kinematic coupling between the arm 62 which carries the cam follower roller 64 and the crank 52 which supports the engagement 42 is concerned. In the embodiment illustrated here reference has been made to a gear coupling (wheel 58—sector 60) which achieves a reversal of the direction of movement. It is naturally possible to have recourse to somewhat different arrangements. This is also true as concerns the dimensioning of the crank 52 which carries the engagement formation 42 as well as the arm 62 which carries the cam follower roller 64. In particular the length of these arms can be determined in conjunction with the transmission ratio of the gears 58, 60 in such a way as to make the transmission ratio of the movement between the various movable elements more or less advantageous. It goes without saying that these choices of detail fall within the margin of discretion left to the man skilled in the art during design.

What is claimed is:

1. In an inverter device capable of acting on pairs of complementary moulds which advance on a conveyor line, whereby respectively to invert a mould and close it over the complementary mould and to invert a mould disposed on said complementary mould to open it, said device having engagement formations capable of engaging said moulds laterally thereof by making an approaching movement towards said conveyor line, the improvement comprising at least one inverter set mounted on a cyclic movement element on each side of said conveyor line such that said at least one inverter set can follow the movement of said complementary mould on said conveyor line in a synchronised manner, a fixed unit and a movable unit on said at least one inverter set, said fixed and movable unit being provided with respective engagement formations capable of selectively engaging at least one of said complementary moulds of said pair by an approaching movement of said inverter set towards said conveyor line, and actuating means associated with said movable unit operating to cause a pivoting movement of said movable unit between a first position in which said engagement formation associated with said movable unit is substantially coplanar with and alongside the engagement formation of said fixed unit at a distance substantially corresponding to the distance which separates said two half-moulds and a second position in which the engagement formation of said movable unit is superimposed over the engagement formation of said fixed unit; said actuating means being actuated as a function of the motion of said inverter set following that of said complementary moulds, caused by said cyclic movement element.

2. The device of claim 1, wherein said fixed and movable units are mounted on a base structure carried by said cyclic movement element and carry associated respective actuation means capable of causing said approaching movement of said inverter set towards said conveyor line.

3. The device of claim 2, wherein said actuation means comprise a cam and a cam follower roller each disposed on a respective one of said conveyor line and said inverter set.

4. The device of claim 3, wherein said cam follower roller is mounted on said inverter set.

5. The device of claim 1, wherein said engagement formations include prong elements capable of penetrating into corresponding apertures provided in said moulds.

6. The device of claim 5, wherein said prong elements have a generally tapered distal end.

7. The device of claim 5, wherein said corresponding apertures have generally flared mouth parts.

8. The device of claim 1, wherein said fixed member includes an engagement part mounted on a rod slidably mounted in a respective receiver sleeve.

9. The device of claim 1, wherein said respective engagement formation of said movable unit is mounted at the end of a crank capable of a pivotal movement to carry said respective engagement formation between said first and second positions thereof.

10. The device of claim 9, wherein said crank is mounted on a shaft moved by a cam so as to obtain said pivotal movement.

11. The device of claim 10, wherein said shaft carries associated gearing having a pivotal cam follower arm for said cam, on the opposite side of said shaft from said pivotal arm.

12. The device of claim 11, wherein said pivotal arm carries a cam follower roller at its end for following said cam.

13. The device of claim 1, wherein said cyclic movement element comprises an element driven in a closed loop so as to present an active branch capable of following the movement of said moulds on said conveyor line.

14. The device of claim 13, wherein said closed loop element is made in the form of one of a strip, a belt and a chain.

* * * * *